United States Patent
Kishikawa et al.

(10) Patent No.: US 10,277,598 B2
(45) Date of Patent: Apr. 30, 2019

(54) METHOD FOR DETECTING AND DEALING WITH UNAUTHORIZED FRAMES IN VEHICLE NETWORK SYSTEM

(71) Applicant: Panasonic Intellectual Property Corporation of America, Torrance, CA (US)

(72) Inventors: Takeshi Kishikawa, Osaka (JP); Hideki Matsushima, Osaka (JP); Tomoyuki Haga, Nara (JP); Yoshihiro Ujiie, Osaka (JP); Yuji Unagami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 327 days.

(21) Appl. No.: 15/209,882

(22) Filed: Jul. 14, 2016

(65) Prior Publication Data

US 2016/0323287 A1 Nov. 3, 2016

Related U.S. Application Data

(63) Continuation of application No. PCT/JP2015/005669, filed on Nov. 13, 2015.
(Continued)

(30) Foreign Application Priority Data

Oct. 23, 2015 (JP) .................. 2015-209331

(51) Int. Cl.
| | |
|---|---|
| H04L 12/26 | (2006.01) |
| H04L 29/06 | (2006.01) |
| H04L 12/40 | (2006.01) |
| B60R 16/023 | (2006.01) |
| H04W 4/02 | (2018.01) |

(52) U.S. Cl.
CPC ............ *H04L 63/10* (2013.01); *B60R 16/023* (2013.01); *H04L 12/40* (2013.01);
(Continued)

(58) Field of Classification Search
CPC ....................................... H04L 12/26
See application file for complete search history.

(56) References Cited

U.S. PATENT DOCUMENTS

| 7,266,088 B1 * | 9/2007 | Virgin | ............... H04L 43/026 370/235 |
| 9,361,797 B1 * | 6/2016 | Chen | .................. G08G 1/0112 |

(Continued)

FOREIGN PATENT DOCUMENTS

| EP | 2892199 A1 | 7/2015 |
| JP | 2013-131907 | 7/2013 |
| WO | 2014/199687 | 12/2014 |

OTHER PUBLICATIONS

Extended European Search Report, dated Oct. 12, 2017 from the European Patent Office (EPO), for the related European Patent Application No. 15877368.9.
(Continued)

*Primary Examiner* — Josnel Jeudy
(74) *Attorney, Agent, or Firm* — Greenblum & Bernstein, P.L.C.

(57) ABSTRACT

A method for dealing with unauthorized frames that makes it possible to take appropriate measures when an unauthorized data frame is detected in a vehicle network system is provided. A plurality of ECUs in the vehicle network system are connected to a bus used for communicating frames. In the method for dealing with unauthorized frames, if a misuse detection ECU that checks a frame appearing in the bus detects an unauthorized frame that does not comply with a certain rule and a certain prevention condition is satisfied, a process for preventing the plurality of ECUs from perform-
(Continued)

ing a process corresponding to the unauthorized frame is performed (an error frame is transmitted) or, if the certain prevention condition is not satisfied, the process is not performed.

11 Claims, 11 Drawing Sheets

Related U.S. Application Data

(60) Provisional application No. 62/105,347, filed on Jan. 20, 2015.

(52) U.S. Cl.
CPC .. *H04L 12/40013* (2013.01); *H04L 12/40026* (2013.01); *H04L 63/0227* (2013.01); *H04W 4/02* (2013.01)

(56) References Cited

U.S. PATENT DOCUMENTS

| | | | |
|---|---|---|---|
| 2003/0037141 A1* | 2/2003 | Milo | H04L 43/00 709/225 |
| 2011/0149746 A1* | 6/2011 | Kang | H04L 43/026 370/242 |
| 2015/0066239 A1 | 3/2015 | Mabuchi | |

OTHER PUBLICATIONS

International Search Report of PCT application No. PCT/JP2015/005669 dated Dec. 22, 2015.

Tsutomu Matsumoto et al., "A Method of Preventing Unauthorized Data Transmission in Controller Area Network" Yokohama National University, Vehicular Technology Conference, 2012.

* cited by examiner

FIG. 5

| ID | TRANSMISSION PERIOD [ms] |
|---|---|
| 0×100 | 20 |
| 0×200 | 100 |
| ... | ... |

FIG. 6

| ID | PREVIOUS RECEPTION TIME [ms] |
|---|---|
| 0×100 | 200 |
| 0×200 | 210 |
| ... | ... |

FIG. 7

| TARGET (ID) | VEHICLE CONTROL INFORMATION (DATA) |
|---|---|
| WINDOW SWITCH (0×100) | CLOSING (1) |

FIG. 8

| TARGET (ID) | PREVENTION CONDITION |
|---|---|
| WINDOW SWITCH (0×100) | CHANGE IN VEHICLE CONTROL INFORMATION (DATA) |

| ID | DATA FIELD (VEHICLE CONTROL INFORMATION) |
|---|---|
| 0×100 | 0×00 |
| 0×100 | 0×02 |
| 0×100 | 0×02 |
| 0×100 | 0×02 |
| 0×100 | 0×01 |
| ... | ... |

FIG. 15

| VEHICLE STATE |
|---|
| RUNNING |

FIG. 16

| VEHICLE STATE | PREVENTION CONDITION |
|---|---|
| RUNNING | VEHICLE CONTROL INFORMATION INDICATES RELEASED DOOR LOCK |

FIG. 17

| ID | DATA FIELD (VEHICLE CONTROL INFORMATION) |
|---|---|
| 0×200 | 0×00 |
| 0×200 | 0×00 |
| 0×200 | 0×01 |
| 0×200 | 0×01 |
| 0×200 | 0×01 |
| ... | ... |

METHOD FOR DETECTING AND DEALING WITH UNAUTHORIZED FRAMES IN VEHICLE NETWORK SYSTEM

BACKGROUND

1. Technical Field

The present invention relates to a technique for detecting and dealing with unauthorized frames transmitted in a vehicle network in which electronic control units perform communication.

2. Description of the Related Art

These days, a large number of devices called "electronic control units (ECUs)" are provided in a system inside an automobile. A network connecting these ECUs with one another is called a "vehicle network". A lot of standards exist for vehicle networks. A standard called a "controller area network (CAN)" specified in International Organization for Standardization (ISO) 11898-1 exists for one of principal vehicle networks.

In the CAN, a communication path is configured by two buses, and ECUs connected to the buses are called "nodes". The nodes connected to the buses communicate messages called "frames". A transmission node, which transmits a frame, applies voltage to the two buses to generate a potential difference between the buses and transmit a value of 1 called a "recessive" and a value of 0 called a "dominant". If a plurality of transmission nodes transmit a recessive and a dominant at exactly the same timing, the dominant takes priority in transmission. If a format of a received frame is abnormal, a reception node transmits a frame called an "error frame". An error frame refers to successive transmission of 6 bits of dominants for notifying a transmission node and other reception nodes of an abnormality in a frame.

In the CAN, there are no identifiers identifying destinations and sources. A transmission node transmits each frame with an identifier (ID) called a "message ID" attached (that is, transmits a signal to the buses), and a reception node receives only a predetermined message ID (that is, reads a signal from the buses). In addition, a carrier sense multiple access with collision avoidance (CSMA/CA) method is employed, and when a plurality of nodes simultaneously perform transmission, mediation is performed using message IDs. That is, a frame whose message ID is smaller takes priority in transmission.

In vehicle networks, there is a threat that an attacker accesses buses and transmits an unauthorized frame (unauthorized data frame) in order to misuse an ECU, and security measures are being examined.

T. Matsumoto, et al., "A Method of Preventing Unauthorized Data Transmission in controller area network—Yokohama National University: Vehicular Technology Conference", 2012, for example, discloses a technique for preventing transmission of an unauthorized data frame using an error frame if transmission of a data frame having an ID that is to be transmitted by an own node is detected on an assumption that a plurality of nodes existing in the same network do not transmit data frames having the same ID.

SUMMARY

If, as in the technique of "A Method of Preventing Unauthorized Data Transmission in controller area network—Yokohama National University: Vehicular Technology Conference", unauthorized data frames are detected on the basis of a certain condition and an error frame is issued each time an unauthorized data frame that satisfies the condition, an effect of the error frames upon the vehicle network might cause problems. Frequent issuance of an error frame, for example, might hinder transmission of authorized data frames and affect control of a vehicle including the vehicle network.

One non-limiting and exemplary embodiment provides a method for dealing with unauthorized frames that makes it possible to take appropriate measures if an unauthorized data frame (a frame that does not comply with a rule) is detected in a vehicle network system. In addition, the present disclosure provides a vehicle network system capable of appropriately dealing with the unauthorized frames and a misuse detection electronic control unit (misuse detection ECU) in the vehicle network system.

In one general aspect, the techniques disclosed here feature a method for dealing with unauthorized frames used by a misuse detection electronic controller that is connected to a bus used by a plurality of electronic controllers in a vehicle network system to communicate frames and that checks a frame appearing in the bus. The method includes checking the frame, recording, if an unauthorized frame that does not comply with a certain rule is detected, at least part of content of one or more frames transmitted through the bus in a memory as history information and determining whether a certain prevention condition is satisfied on the basis of content of the unauthorized frame and content of one or more frames transmitted prior to the unauthorized frame by referring to the history information, and performing, (i) if the certain prevention condition is satisfied, a process for preventing the plurality of electronic controllers from performing a process corresponding to the unauthorized frame or, (ii) if the certain prevention condition is not satisfied, not performing the process.

According to the present disclosure, appropriate measures can be taken if an unauthorized frame transmitted in the vehicle network is detected.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a diagram illustrating an example of misuse detection rules stored in the misuse detection ECU according to the first embodiment;

FIG. 6 is a diagram illustrating an example of a frame reception history (previous reception time) stored in the misuse detection ECU according to the first embodiment;

FIG. 7 is a diagram illustrating an example of a vehicle control history recorded in the misuse detection ECU according to the first embodiment;

FIG. 8 is a diagram illustrating an example of a prevention determination rule used by the misuse detection ECU according to the first embodiment;

FIG. 15 is a diagram illustrating an example of a state of a vehicle stored in the misuse detection ECU according to the second embodiment;

FIG. 16 is a diagram illustrating an example of a prevention determination rule used by the misuse detection ECU according to the second embodiment;

FIG. 17 is a diagram illustrating an example of transmission frames of an ECU according to the second embodiment.

DETAILED DESCRIPTION

Figure 1:
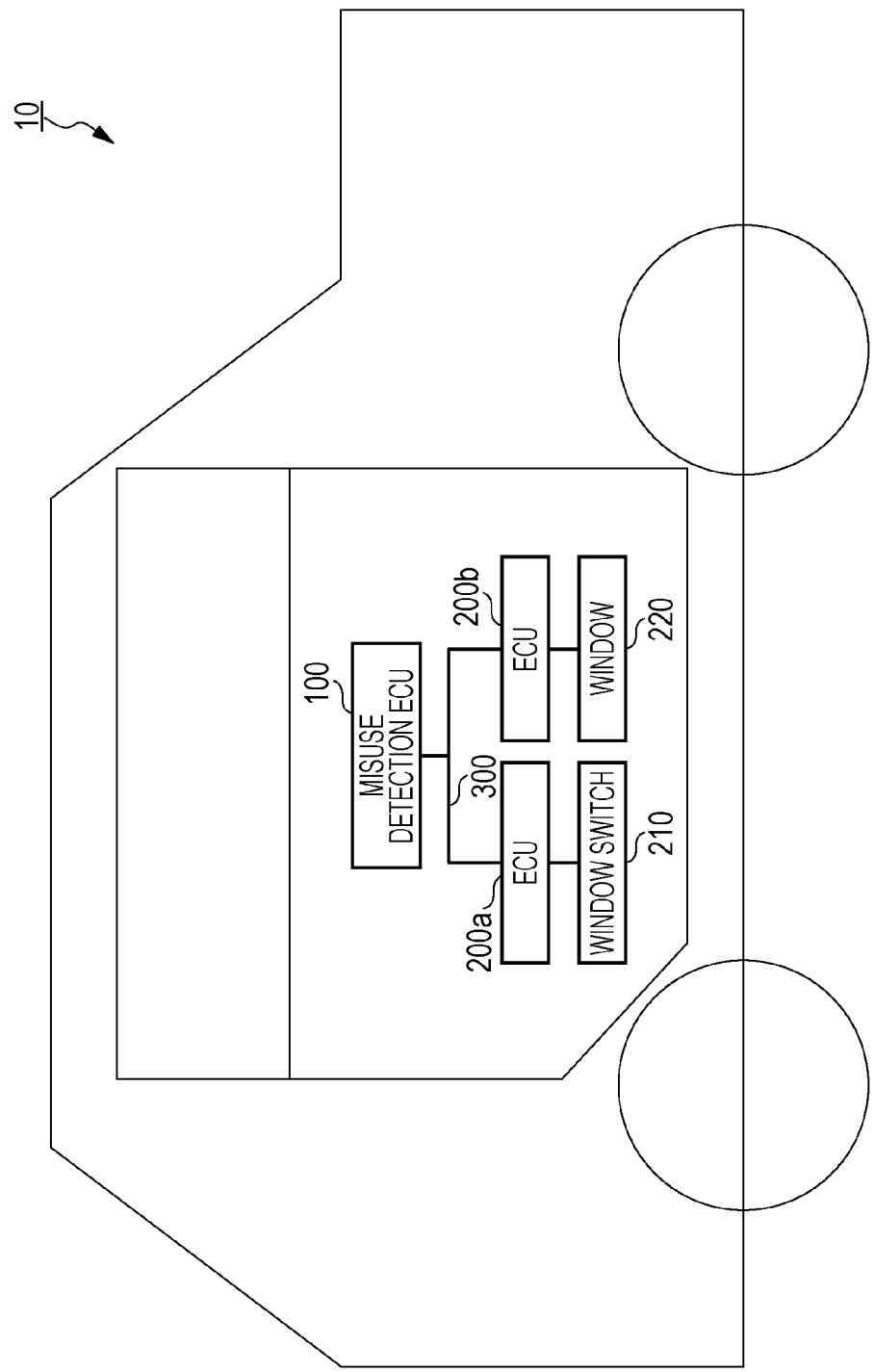
FIG. 1 is a diagram illustrating an overall configuration of a vehicle network system according to a first embodiment.

A method for dealing with unauthorized frames according to an aspect of the present disclosure is a method for dealing with unauthorized frames used by a misuse detection electronic controller that is connected to a bus used by a plurality of electronic controllers in a vehicle network system to communicate frames and that checks a frame appearing in the bus. The method includes checking the frame, recording, if an unauthorized frame that does not comply with a certain rule is detected, at least part of content of one or more frames transmitted through the bus in a memory as history information and determining whether a certain prevention condition is satisfied on the basis of content of the unauthorized frame and content of one or more frames transmitted prior to the unauthorized frame by referring to the history information, and performing, (i) if the certain prevention condition is satisfied, a process for preventing the plurality of electronic controllers from performing a process corresponding to the unauthorized frame or, (ii) if the certain prevention condition is not satisfied, not performing the process. As a result, appropriate measures can be taken if an unauthorized frame transmitted in the vehicle network is detected. The certain prevention condition can be predetermined in view of adverse effects upon the vehicle network at a time when an unauthorized frame appears in the bus and the ECUs deal with the unauthorized frame in the same manner as an authorized frame and necessity to prevent the unauthorized frame, in order to suppress the adverse effects. It is therefore possible to switch whether to prevent an unauthorized frame in accordance with a degree of effect upon vehicle control, thereby suppressing adverse effects.

In addition, a bit value relating to the unauthorized frame appearing in the bus may be changed as the prevention process. As a result, by changing a bit value of an unauthorized frame if the certain prevention condition is satisfied, it becomes possible to prevent the unauthorized frame from reaching the ECUs in a complete state.

In addition, a state of a vehicle includes at least any of a speed of the vehicle, a rotational angle of a steering wheel, statistical information regarding amount of traffic in the bus, and history information regarding detection of unauthorized frames that do not comply with the certain rule. As a result, it becomes possible to switch whether to prevent transmission of an unauthorized frame in consideration of an effect upon vehicle control on the basis of a relationship with a history of control caused by frames or the like, thereby maintaining safe driving of a vehicle.

In addition, the plurality of electronic control units may perform communication through the bus in accordance with a CAN protocol. It may be determined that the certain prevention condition is satisfied if content of a certain field of the unauthorized frame is different from content of the certain field of one of frames including the same frame ID as the unauthorized frame transmitted immediately before the unauthorized frame and it may be determined that the certain prevention condition is not satisfied if the content matches. As a result, if there has been no change in the content of a data frame, an effect of the prevention process upon the vehicle network can be suppressed on the basis of a relationship with previously transmitted data frames using the same message ID.

In addition, the certain prevention condition may include a condition relating to at least any of a state of a vehicle including the misuse detection electronic control unit, a state of a driver of the vehicle, and a state of a driving environment of the vehicle. It may be determined whether the certain prevention condition is satisfied on the basis of the content of the unauthorized frame, content of one or more frames transmitted prior to the unauthorized frame, and a result of detection of at least any of the state of the vehicle, the state of the driver of the vehicle, and the state of the driving environment of the vehicle. In addition, the certain prevention condition may be a condition relating to at least any of a state of a vehicle including the misuse detection electronic control unit, a state of a driver of the vehicle, and a state of a driving environment of the vehicle. It may be determined whether the certain prevention condition is satisfied on the basis of a result of detection of at least any of the state of the vehicle, the state of the driver of the vehicle, and the state of the driving environment of the vehicle. As a result, by predetermining the certain prevention condition in consideration of an effect of the prevention process on the basis of a relationship with the state of the vehicle, an unauthorized frame can be appropriately dealt with.

In addition, in the vehicle network system, a plurality of buses may be used for the communication performed by the plurality of electronic control units and the misuse detection electronic control unit may have a function of transferring a frame appearing one of the plurality of buses to another bus. If an unauthorized frame appearing in the one of the plurality of buses is detected and the certain prevention condition is satisfied, the prevention process may be performed by suppressing the transfer and, if the certain prevention condition is not satisfied, the transfer may be performed. As a result, by not transferring an unauthorized frame if the certain prevention condition is satisfied, it becomes possible to prevent the unauthorized frame from reaching the ECUs.

In addition, the plurality of electronic control units may perform communication through the bus in accordance with a CAN protocol. As a result, in the vehicle network system according to the CAN, it becomes possible to switch whether to prevent an unauthorized frame in accordance with a degree of effect upon vehicle control.

In addition, an error frame may be transmitted to the bus as the prevention process. As a result, by predetermining the certain prevention condition in view of an effect of transmission of an error frame upon the vehicle network, an unauthorized frame can be appropriately dealt with.

In addition, a misuse detection electronic control unit according to an aspect of the present disclosure is a misuse detection electronic controller that is connected to a bus used by a plurality of electronic controllers to communicate frames and that checks a frame appearing in the bus. The misuse detection electronic controller includes a processor, and a memory having a computer program stored thereon, the computer program causing the processor to execute operations including checking the frame, recording, if an unauthorized frame that does not comply with a certain rule is detected as a result of the checking, at least part of content of one or more frames transmitted through the bus in a memory as history information and determining whether a certain prevention condition is satisfied on the basis of content of the unauthorized frame and content of one or more frames transmitted prior to the unauthorized frame by referring to the history information, and determining whether to perform a process for preventing the plurality of electronic controllers from performing a process corresponding to the detected unauthorized frame by determining whether the certain prevention condition is satisfied. As a result, if an unauthorized frame is detected, appropriate measures can be taken.

In addition, a vehicle network system according to an aspect of the present disclosure is a vehicle network system including a plurality of electronic controllers that communicate frames through a bus, and a misuse detection electronic controller that is connected to the bus and that checks a frame appearing in the bus. The misuse detection electronic controller includes a processor, and a memory having a computer program stored thereon, the computer program causing the processor to execute operations including checking the frame, recording, if an unauthorized frame that does not comply with a certain rule is detected, at least part of content of one or more frames transmitted through the bus in a memory as history information and determining whether a certain prevention condition is satisfied on the basis of content of the unauthorized frame and content of one or more frames transmitted prior to the unauthorized frame by referring to the history information, and performing, (i) if the certain prevention condition is satisfied, a process for preventing the plurality of electronic controllers from performing a process corresponding to the unauthorized frame or not performing, (ii) if the certain prevention condition is not satisfied, the process. As a result, it is possible, for example, to prevent transmission of an unauthorized frame in consideration of an effect upon vehicle control.

It is to be noted that these general or specific aspects may be achieved by a system, a method, an integrated circuit, a computer program, or a computer-readable recording medium such as a compact disc read-only memory (CD-ROM), or any selective combination thereof.

Vehicle network systems according to embodiments that use a method for dealing with unauthorized frames will be described hereinafter with reference to the drawings. The following embodiments are specific examples of the present disclosure. Values, components, the arrangement and connection modes of the components, steps, the order of steps, and the like mentioned in the following embodiments, therefore, are examples and do not limit an aspect of the present disclosure. Among the components described in the following embodiments, ones not described in independent claims are components that may be arbitrarily added. In addition, the drawings are schematic diagrams and not necessarily strict illustrations.

First Embodiment

A method for dealing with unauthorized frames in which a misuse detection ECU detects an unauthorized data frame transmitted to a bus used by a vehicle network system 10 that is mounted on a vehicle and in which a plurality of ECUs communicate with one another through the bus will be described hereinafter as an embodiment of the present disclosure with reference to the drawings. The misuse detection ECU performs checking on the basis of a certain rule (misuse detection rule) for checking whether a frame appearing in the bus used for the communication between the ECUs included in the vehicle network system 10 is an unauthorized frame (that is, determines whether the frame complies with the rule). If, as a result of the checking, determining that the frame is an unauthorized frame (that is, if an unauthorized frame is detected), the misuse detection ECU determines whether to prevent the ECUs from performing a process corresponding to the unauthorized frame (prevention of performance will also be simply referred to as "prevention" herein) on the basis of whether a certain prevention condition is satisfied. The prevention refers to performing a prevention process. Here, the vehicle network system 10 including a misuse detection ECU 100 will be described that switches whether to prevent an unauthorized frame on the basis of whether vehicle control information, which is data included in a data frame determined to be an unauthorized frame, satisfies the certain prevention condition, which has been predetermined in view of a degree of effect upon vehicle control. The prevention of an unauthorized frame refers to preventing one or more ECUs included in the vehicle network system 10 from receiving the unauthorized frame and performing a process (control or the like) corresponding to the unauthorized frame as in the case of an authorized frame. The prevention of an unauthorized frame can be achieved, for example, by preventing transmission of the unauthorized frame by changing a bit value of the unauthorized frame in the bus in order to prevent the ECUs from receiving the unauthorized frame from the bus in a complete state (e.g., by overwriting the unauthorized frame by transmitting an error frame).

1.1 Overall Configuration of Vehicle Network System 10

FIG. 1 is a diagram illustrating an overall configuration of the vehicle network system 10. The vehicle network system 10 is an example of a network communication system that performs communication in accordance with a CAN protocol and a network communication system in an automobile in which various devices such as a control apparatus, and sensors are mounted. The vehicle network system 10 is configured by including a bus 300 and nodes connected to the bus including ECUs, such as ECUs 200a and 200b, connected to the misuse detection ECU 100 and the various devices. Although omitted in FIG. 1, the vehicle network system 10 can include a number of ECUs other than the ECUs 200a and 200b. In the vehicle network system 10, the ECUs communicate frames in accordance with the CAN protocol. Each ECU, for example, is a device including a digital circuit, an analog circuit, a communication circuit, and the like such as a processor (microprocessor) and a memory. The memory is a read-only memory (ROM), a random-access memory (RAM), or the like and is capable of storing control programs (computer programs) executed by the processor. When the processor operates in accordance with the control programs (computer programs), for example, the ECUs achieve various functions. It is to be noted that the computer programs are configured by combining a plurality of command codes indicating instructions to the processor in order to achieve certain functions. The bus 300 might be connected to an unauthorized ECU that transmits an unauthorized message, and if an unauthorized frame that does not comply with a misuse detection rule appears in the bus, the misuse detection ECU 100 detects the unauthorized frame on the basis of the rule.

The misuse detection ECU 100 is a kind of ECU connected to the bus 300 and has a function of monitoring frames appearing in the bus connected thereto and, if an unauthorized frame is detected, dealing with the unauthorized frame, for example, by transmitting an error frame in accordance with a result of a determination whether the certain prevention condition is satisfied.

The ECUs 200a and 200b are connected to a window switch 210 and a window 220, respectively. The ECU 200a obtains a state of the window switch 210, includes vehicle control information regarding the state (information for controlling the window 220 here) in a data frame, and transmits the data frame to the bus 300. The ECU 200b controls opening and closing of the window 220 in accordance with the vehicle control information included in the data frame that has been transmitted from the ECU 200a and relating to the state of the window switch 210.

1.2 Data Frame Format

A data frame, which is one of frames used in a network according to the CAN protocol, will be described hereinafter.

Figure 2:
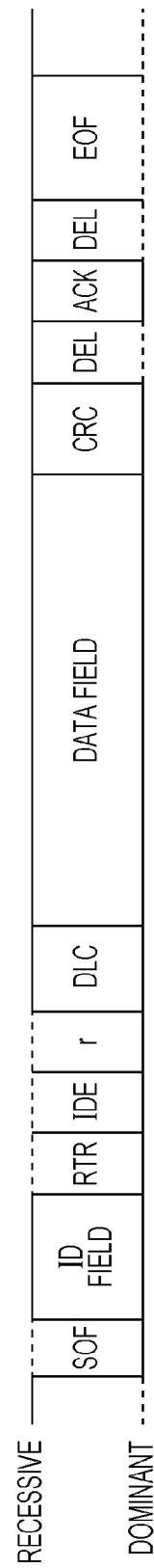
FIG. 2 is a diagram illustrating a format of a data frame specified in a CAN protocol.

FIG. 2 is a diagram illustrating a format of a data frame specified in the CAN protocol. The figure illustrates a data frame in a standard ID format specified in the CAN protocol. The data frame includes fields of a start of frame (SOF), an ID field, a remote transmission request (RTR), an identifier extension (IDE), a reserved bit "r", a data length code (DLC), a data field, a cyclic redundancy check (CRC) sequence, a CRC delimiter "DEL", an acknowledgement (ACK) slot, an ACK delimiter "DEL", and an end of frame (EOF).

The SOF is configured by a 1-bit dominant. When the bus is idle, a data frame is recessive. By making the data frame dominant using the SOF, start of transmission of the frame is notified.

The ID field is a field in which an ID (frame ID), which is a value configured by 11 bits and indicating a type of data, is stored. The ID field is designed such that a frame having a smaller ID value has higher priority, so that if a plurality of nodes simultaneously start transmission, the communication can be mediated using the ID field. The frame ID is also referred to as a "message ID".

The RTR is a value for identifying the data frame and a remote frame. In the data frame, the RTR is configured by a dominant 1 bit.

The IDE and the "r" are both configured by a dominant 1 bit.

The DLC is configured by 4 bits and is a value indicating the length of the data field. It is to be noted that the IDE, the r, and the DLC are collectively referred to as a "control field".

The data field is a value configured by up to 64 bits and indicating the content of data to be transmitted. The length can be adjusted in steps of 8 bits. Specifications of the data to be transmitted are not specified in the CAN protocol but determined by the vehicle network system 10. The specifications, therefore, depend upon a vehicle model, a manufacturer (manufacturing maker), or the like.

The CRC sequence is configured by 15 bits. The CRC sequence is calculated from values transmitted in the SOF, the ID field, the control field, and the data field.

The CRC delimiter is a delimitation sign configured by a 1-bit recessive and indicating an end of the CRC sequence. It is to be noted that the CRC sequence and the CRC delimiter are collectively referred to as a "CRC field".

The ACK slot is configured by 1 bit. A transmission node performs transmission by making the ACK slot recessive. If a reception node can correctly receive a data frame up to the CRC sequence, the reception node performs transmission by making the ACK slot dominant. Since a dominant takes priority over a recessive, if the ACK slot is dominant after the transmission, the transmission node can affirm that any of reception nodes has successfully received the data frame.

The ACK delimiter is a delimitation sign configured by a 1-bit recessive and indicating an end of the ACK.

The EOF is configured by 7 bits of recessives and indicates an end of the data frame.

1.3 Error Frame Format

Figure 3:
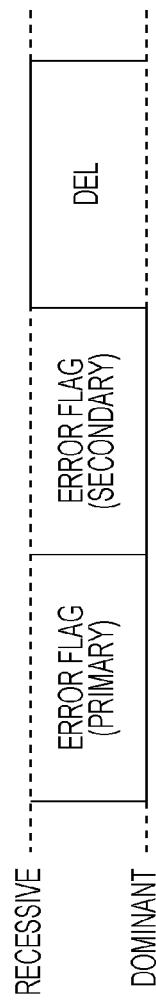
FIG. 3 is a diagram illustrating a format of an error frame specified in the CAN protocol.

FIG. 3 is a diagram illustrating a format of an error frame specified in the CAN protocol. The error frame is configured by an error flag (primary), an error flag (secondary), and an error delimiter.

The error flag (primary) is used for notifying another node of occurrence of an error. A node that has detected an error successively transmits 6 bits of dominants in order to notify another node of occurrence of the error. Because the transmission violates a bit stuffing rule (6 bits or more of the same value must not be successively transmitted) in the CAN protocol, another node is caused to transmit an error frame (secondary).

The error flag (secondary) is configured by 6 consecutive bits of dominants used for notifying another node of occurrence of an error. All nodes that have received an error flag (primary) and detected a violation of the bit stuffing rule transmit the error flag (secondary).

The error delimiter "DEL" is 8 consecutive bits of recessives and indicates an end of the error frame.

1.4 Configuration of Misuse Detection ECU 100

Figure 4:
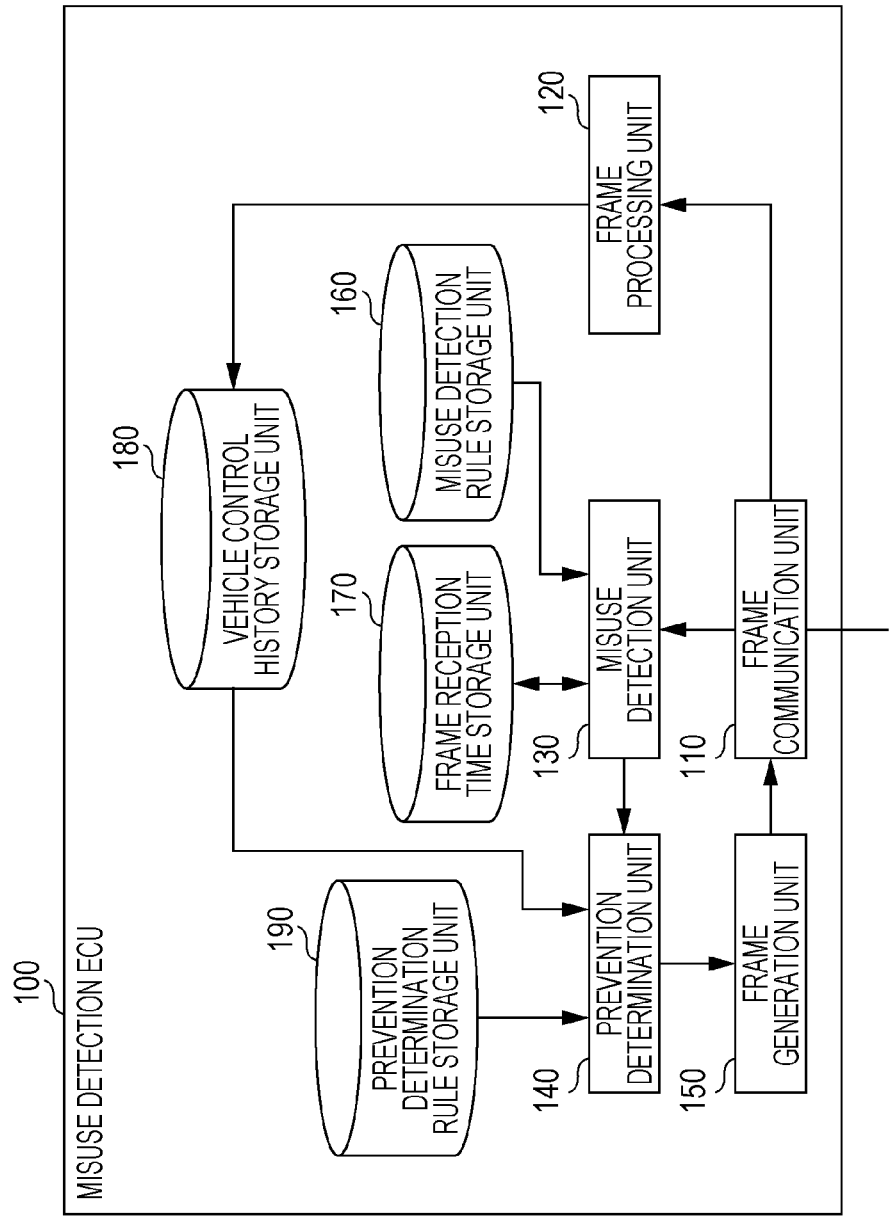
FIG. 4 is a diagram illustrating the configuration of a misuse detection ECU according to the first embodiment.

FIG. 4 is a diagram illustrating the configuration of the misuse detection ECU 100. The misuse detection ECU 100 is configured by including a frame communication unit 110, a frame processing unit 120, a misuse detection unit 130, a prevention determination unit 140, a frame generation unit 150, a misuse detection rule storage unit 160, a frame reception time storage unit 170, a vehicle control history storage unit 180, and a prevention determination rule storage unit 190. These components are functional components and functions thereof are achieved by the communication circuit and the processor, the digital circuit, or the like that executes the control programs stored in the memory in the misuse detection ECU 100.

The frame communication unit 110 communicates data frames according to the CAN protocol with the bus 300. That is, the frame communication unit 110 receives a frame from the bus 300 bit by bit and transfers information such as an ID, a DLC, and data included in the data frame that is being receive to the misuse detection unit 130. In addition, if reception of the data frame is completed without an error, the frame communication unit 110 transfers the information such as the ID, the DLC, and the data included in the data frame to the frame processing unit 120. In addition, if determining that the data frame does not comply with the CAN protocol, the frame communication unit 110 transmits an error frame. In addition, if receiving an error frame, that is, if interpreting a received frame as an error frame on the basis of a value included in the frame, the frame communication unit 110 discards a subsequent portion of the frame. In addition, if receiving a notification of an error frame generated by the frame generation unit 150 upon a request from the prevention determination unit 140, too, the frame communication unit 110 transmits an error frame to the bus 300. A process according to the CAN protocol, such as communication mediation, is also achieved by the frame communication unit 110.

The frame processing unit 120 receives information in a data frame from the frame communication unit 110 and interprets the content of the data frame. The frame processing unit 120 updates a vehicle control history stored in the vehicle control history storage unit 180 in accordance with vehicle control information transmitted from the ECU 200*a* and indicating the state of the window switch 210.

The misuse detection unit 130 determines (checks) whether a data frame received from the bus is an unauthorized data frame on the basis of a certain rule (misuse detection rule) stored in the misuse detection rule storage unit 160. The misuse detection unit 130 has a function of measuring a present time. The misuse detection unit 130 refers to a transmission period, which is a misuse detection rule stored in the misuse detection rule storage unit 160, predetermined for an ID (message ID) of each data frame and, if a transmission period obtained from a reception time of a received data frame and a previous reception time of a data frame for each ID stored in the frame reception time storage unit 170 is shorter than the predetermined transmission period, determines that the received data frame is unauthorized. Because the transmission period can be longer due to communication mediation or the like, a data frame is determined to be not unauthorized if a transmission period thereof is not shorter than the predetermined transmission period. If a received data frame is determined to be unauthorized (that is, if an unauthorized frame is detected), the misuse detection unit 130 notifies the prevention determination unit 140 of the content of the data frame so far when data (vehicle control information) in a data field of the data frame can be received. In addition, if determining that a received data frame is not unauthorized (authorized data frame), the misuse detection unit 130 updates a reception time of a data frame having a corresponding ID stored in the frame reception time storage unit 170. In the case of reception of a first data frame, the misuse detection unit 130 cannot identify a transmission period but determines that the data frame is an authorized data frame and updates a reception time of a corresponding ID stored in the frame reception time storage unit 170.

If the prevention determination unit 140 receives a notification of a data frame determined by the misuse detection unit 130 to be unauthorized, the prevention determination unit 140 refers to a history of vehicle control information included in the data frame stored in the vehicle control history storage unit 180. The prevention determination unit 140 then determines whether to prevent the unauthorized frame by determining whether the certain prevention condition predetermined in view of an effect upon vehicle control is satisfied. If notified that the misuse detection unit 130 has determined that a data frame including a message ID used by the ECU 200*a* for transmission is unauthorized, for example, the prevention determination unit 140 determines whether the certain prevention condition indicated by a prevention determination rule stored in the prevention determination rule storage unit 190 is satisfied. The certain prevention condition is a condition used for determining whether to perform the prevention process. If a relationship between vehicle control information included in the data frame determined to be unauthorized and the vehicle control information recorded in the vehicle control history storage unit 180 as a history satisfies the certain prevention condition, for example, the prevention determination unit 140 requests the frame generation unit 150 to generate an error frame in order to prevent the data frame (that is, in order to prevent the ECUs from performing a process corresponding to the data frame). After the error frame is generated, the frame communication unit 110 transmits the error frame to the bus. The unauthorized data frame is overwritten with the error frame including a plurality of consecutive dominants, which have priority over recessives, in the bus. On the other hand, if the certain prevention condition is not satisfied, the prevention determination unit 140 does not prevent the data frame determined to be unauthorized. An error frame, therefore, is not transmitted.

The frame generation unit 150 generates an error frame in accordance with a request to generate an error frame from the prevention determination unit 140, transmits the error frame to the frame communication unit 110, and causes the frame communication unit 110 to transmit the error frame.

The misuse detection rule storage unit 160 stores misuse detection rules (refer to FIG. 5) referred to by the misuse detection unit 130.

The frame reception time storage unit 170 stores a frame reception history (refer to FIG. 6) indicating a previous reception time of a data frame for each ID referred to by the misuse detection unit 130.

The vehicle control history storage unit 180 stores a history of vehicle control information (refer to FIG. 7) included in a data frame interpreted by the frame processing unit 120 by recording the history on a storage medium or the like.

The prevention determination rule storage unit 190 stores a rule used by the prevention determination unit 140 to determine whether to prevent a data frame determined to be unauthorized.

1.5 Example of Misuse Detection Rules

FIG. 5 illustrates an example of the misuse detection rules stored in the misuse detection rule storage unit 160. In the example illustrated in the figure, a normal transmission period is predetermined for each ID (message ID) of a data frame as a misuse detection rule. In this example, it is indicated that a normal transmission period of a data frame whose ID is 0x100 is 20 ms, and a normal period of a data frame whose ID is 0x200 is 100 ms. In the misuse detection ECU 100, if a period is shorter than this normal transmission period, a data frame is determined to be unauthorized. It is to be noted that the misuse detection rule storage unit 160 may store encrypted misuse detection rules.

1.6 Example of Frame Reception Histories

FIG. 6 illustrates an example of the frame reception histories stored in the frame reception time storage unit 170. As illustrated in the figure, a frame reception history indicates a previous reception time of a data frame for each ID (message ID) of a data frame. In the example illustrated in FIG. 6, a previous reception time of a data frame whose ID is 0x100 is 200 ms, and a previous reception time of a data frame whose ID is 0x200 is 210 ms. The previous reception time, for example, indicates an elapsed time since the misuse detection ECU 100 was activated. The previous reception time is set to 0 when the misuse detection ECU 100 is activated, and if a previous reception time of an ID of a data frame is 0, it is determined that the data frame is received for the first time. The misuse detection ECU 100 is activated, for example, when a vehicle including the misuse detection ECU 100 enters an ignition state (e.g., when an ignition key is inserted into an ignition cylinder). The previous reception time in the frame reception history is updated each time a data frame is received.

1.7 Example of Vehicle Control History

FIG. 7 illustrates an example of the vehicle control history stored in the vehicle control history storage unit 180. In the example illustrated in the figure, vehicle control information in a data field of a previously received data frame relating to the window switch 210 is indicated as a vehicle control history. The vehicle control information relating to the window switch 210 indicates "closing". The vehicle control information in the vehicle control history in this example records the data field of the previously received data frame and is updated in accordance with a data field of a data frame each time a data frame is received.

1.8 Example of Prevention Determination Rule

FIG. 8 illustrates an example of the rule (certain prevention condition) for determining whether to prevent a data frame stored in the prevention determination rule storage unit 190. The rule is determined in view of the magnitude of a degree of effect upon vehicle control. In the example illustrated in FIG. 8, a certain prevention condition is determined with which a determination can be made on the basis of vehicle control information included in a data frame determined to be unauthorized and a vehicle control history relating to a previously received data frame including the same message ID as the data frame. In this example, the certain prevention condition is satisfied if a data frame that includes vehicle control information relating to the window switch 210 and whose message ID is 0x100 is determined to be unauthorized and the vehicle control information included in the data frame has changed from vehicle control information as a vehicle control history of a corresponding ID stored in the vehicle control history storage unit 180 (if data values of the vehicle control information are different from each other). If the certain prevention condition is satisfied, the unauthorized data frame is prevented (the ECUs are prevented from receiving the data frame and performing a corresponding process).

1.9 Configuration of ECU 200*a*

Figures 9, 10:
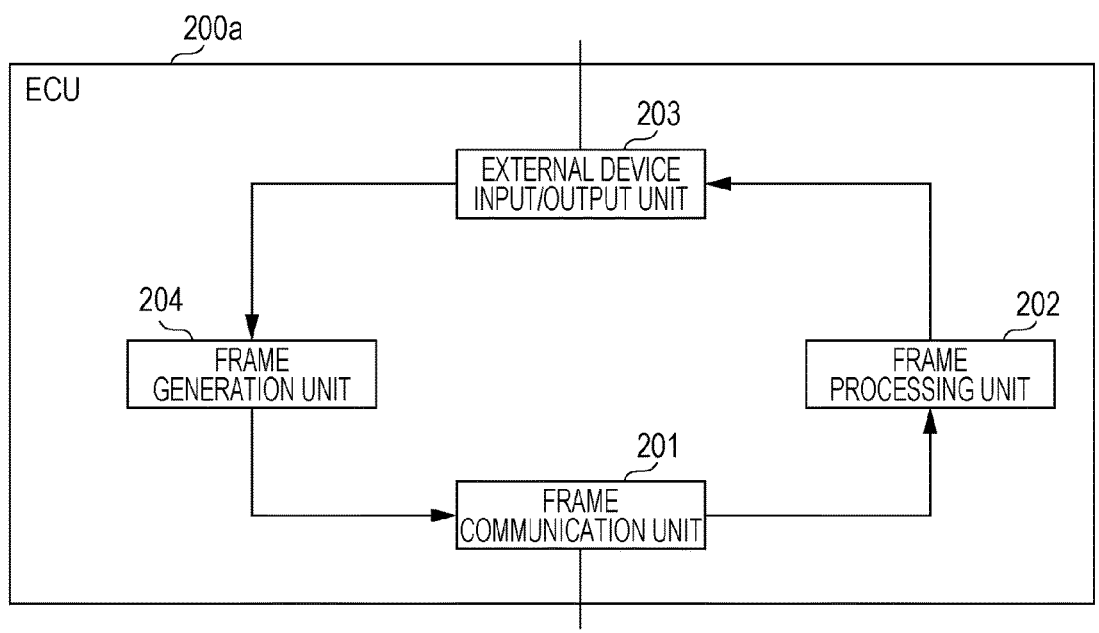
FIG. 9 is a diagram illustrating the configuration of an ECU according to the first embodiment.
FIG. 10 is a diagram illustrating an example of transmission frames of the ECU according to the first embodiment.

FIG. 9 is a diagram illustrating the configuration of the ECU 200*a*. The ECU 200*a* includes a frame communication unit 201, a frame processing unit 202, an external device input/output unit 203, and a frame generation unit 204. These components are functional components, and functions thereof are achieved by a communication circuit and a processor, a digital circuit, or the like that executes control programs stored in a memory in the ECU 200*a*. It is to be noted that the ECU 200*b* has the same configuration.

The frame communication unit 201 communicates data frames according to the CAN protocol with the bus 300. The frame communication unit 201 receives a data frame from the bus 300 bit by bit and, if reception of the data frame is completed without an error, transfers information such as an ID, a DLC, and data included in the data frame to the frame processing unit 202. If determining that the data frame does not comply with the CAN protocol, the frame communication unit 201 transmits an error frame. In addition, if receiving an error frame, the frame communication unit 201 discards a subsequent portion of the data frame that is being received. A process according to the CAN protocol, such as communication mediation, is also achieved by the frame communication unit 201.

The frame processing unit 202 interprets the content of a received data frame. The ECU 200*b*, for example, interprets vehicle control information included in a data frame transmitted from the ECU 200*a* and relating to the state of the window switch 210 and transmits information for controlling the window 220 to the external device input/output unit 203 in order to control the window 220.

The external device input/output unit 203 communicates with an external device connected to the ECU 200*a* or the ECU 200*b*. In the case of the ECU 200*a*, for example, the external device input/output unit 203 is connected to the window switch 210 and obtains a state indicating whether the window switch 210 has been pressed (operated). The external device input/output unit 203 then notifies the frame generation unit 204 whether an operation for "closing" the window 220 or an operation for "opening" the window 220 has been performed or there is "no operation". In the case of the ECU 200*b*, for example, the external device input/output unit 203 opens or closes the window 220 by outputting control information to the window 220 on the basis of a value transmitted from the frame processing unit 202.

The frame generation unit 204 generates a data frame to be transmitted to the bus 300. In the ECU 200*a*, for example, the frame generation unit 204 generates a data frame including information (vehicle control information) transmitted from the external device input/output unit 203 and relating to the state of the window switch 210 at intervals of 20 ms, which is a predetermined period, and transmits the data frame to the frame communication unit 201. It is to be noted that although the intervals at which a data frame is generated are 20 ms, the intervals need not be 20 ms. FIG. 10 illustrates an example of data frames transmitted by the ECU 200*a*.

1.10 Example of Data Frames Transmitted by ECU 200*a*

FIG. 10 illustrates an example of IDs and data (vehicle control information in data fields) of data frames transmitted by the ECU 200*a* connected to the window switch 210. A data value of a data frame whose message ID is "0x100" indicates the state of the window switch 210. The value changes between 0x00 and 0x02 depending on the state of the window switch 210. 0x00 indicates that "no operation" is performed on the window switch 210. 0x01 indicates that an operation for "closing" the window 220 is performed on the window switch 210. 0x02 indicates that an operation for "opening" the window 220 is performed on the window switch 210. Data is transmitted using 1 byte. FIG. 10 illustrates, from a top row to a bottom row, an example of message IDs and data corresponding to frames sequentially transmitted by the ECU 200a. "No operation" and "opening" requests are transmitted in this order, and then a "closing" request is transmitted.

1.11 Example of Operation of Each ECU During Communication of Data Frames

Figure 11:
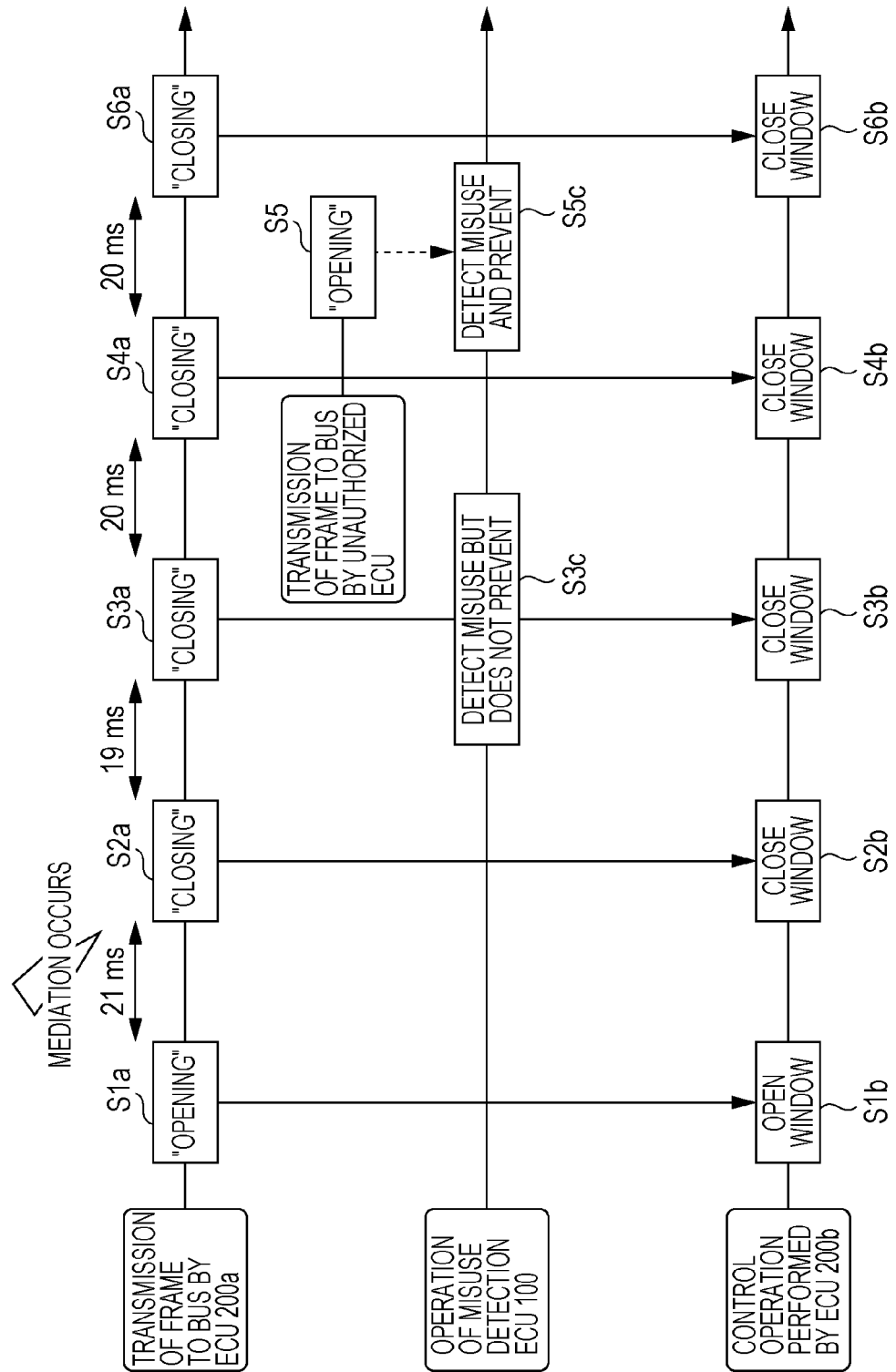
FIG. 11 is a diagram illustrating an example of the operation of each ECU during communication of data frames according to the first embodiment.

FIG. 11 is a diagram illustrating an example of the operation of each ECU during communication of data frames. In the example illustrated in the figure, the ECU 200a transmits a data frame for controlling the window 220 in accordance with the state of the window switch 210 at intervals of 20 ms. First, the ECU 200a transmits a data frame for "opening" the window 220 (step S1a) and then transmits data frames for "closing" the window 220 (steps S2a to S6a). When the ECU 200a transmits the second data frame (step S2a), communication mediation occurs, and a transmission period until the second transmission becomes longer than 20 ms. At this time, the frame communication unit 201 of the ECU 200a performs the process for mediating communication, but since the frame generation unit 204 regularly requests the frame communication unit 201 to transmit a data frame, a transmission interval between the second and third data frames is shorter than the predetermined transmission period. When the ECU 200a receives the third data frame (step S3a), therefore, the misuse detection ECU 100 determines that the third data frame is an unauthorized data frame (misuse detection), but since the content of the data frame is "closing", which is the same as a previously received value, the certain prevention condition (refer to FIG. 8) is not satisfied. The misuse detection ECU 100, therefore, does not prevent the data frame (step S3c). Next, the ECU 200a transmits the fourth data frame (step S4a). After receiving data frames from the ECU 200a, the ECU 200b has so far controlled the window 220 in accordance with the data frames (steps S1b, S2b, S3b, and S4b). In addition, an unauthorized data frame for "opening" the window 220 is transmitted to the bus 300 from a device other than the ECU 200a (step S5) between transmission of the fourth and fifth data frames from the ECU 200a (steps S4a and S6a). The misuse detection ECU 100 determines that the data frame is an unauthorized frame (misuse detection), and since the content of the data frame has changed from "closing" to "opening", which satisfies the certain prevention condition, prevents the data frame (more specifically, transmits an error frame) (step S5c). As a result, the ECU 200b does not completely receive the unauthorized data frame, thereby preventing unauthorized control of the window 220. The ECU 200b then receives the fifth data frame transmitted from the ECU 200a (step S6a) and controls the opening and closing of the data frame in accordance with the content of the data frame (step S6b).

1.12 Process for Receiving Data Frame Performed by Misuse Detection ECU 100

Figure 12:
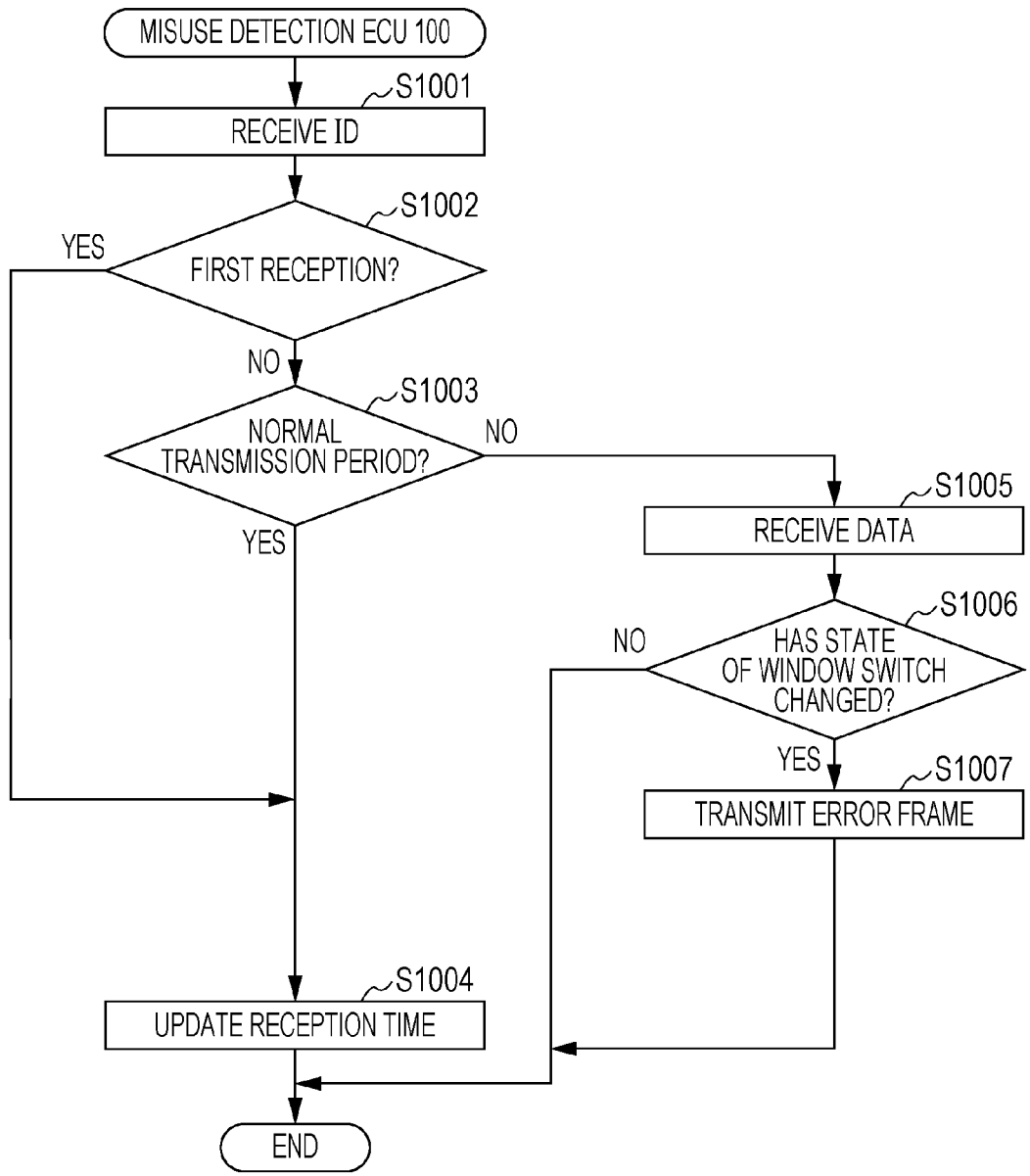
FIG. 12 is a flowchart illustrating a process for receiving a data frame performed by the misuse detection ECU according to the first embodiment.

FIG. 12 is a flowchart illustrating a process for receiving a data frame performed by the misuse detection ECU 100. The operation of the misuse detection ECU 100 during reception of a data frame will be described hereinafter with reference to the figure.

After a data frame is transmitted to the bus 300, the misuse detection ECU 100 receives an ID (message ID) of the data frame appearing in the bus 300 (step S1001).

The misuse detection ECU 100 refers to a misuse detection rule stored in the misuse detection rule storage unit 160 and a frame reception history stored in the frame reception time storage unit 170 to determine whether the data frame that is being received is a first data frame having the ID (message ID) received thereby (step S1002). If the data frame is not the first data frame having the ID received by the misuse detection ECU 100, the misuse detection ECU 100 determines whether a transmission period identified from a reception time is a normal transmission time (that is, whether the transmission period is not shorter than the transmission period indicated by a misuse detection rule) (step S1003). If the data frame is the first data frame having the ID received by the misuse detection ECU 100, the misuse detection ECU 100 skips the determination in step S1003, measures a reception time of the data frame, updates the frame reception history stored in the frame reception time storage unit 170 (step S1004), and ends the process for receiving a data frame.

If it is determined in the determination in step S1003 that the transmission period is a normal transmission period, the misuse detection ECU 100 updates the frame reception history in step S1004 and ends the process for receiving a data frame. If it is determined that the transmission period is not a normal transmission period (that is, if it is determined that the data frame is an unauthorized frame), the misuse detection ECU 100 receives a data field (data) of the data frame that is being received (step S1005).

After step S1005, the misuse detection ECU 100 determines whether the certain prevention condition is satisfied on the basis of the rule stored in the prevention determination rule storage unit 190 using the data (vehicle control information) in the data frame that is being received and vehicle control information relating to the state of the window switch 210, which is the vehicle control history stored in the vehicle control history storage unit 180 (step S1006). If the vehicle control information indicating the state of the window switch 210 has changed, the misuse detection ECU 100 determines that the certain prevention information is satisfied, and transmits an error frame to prevent the unauthorized data frame from being processed by the ECUs in the same manner as a normal frame (step S1007). On the other hand, if the vehicle control information has not changed, the misuse detection ECU 100 skips step S1007 and ends the process for receiving a data frame without transmitting an error frame.

1.13 Advantageous Effects Produced by First Embodiment

In the vehicle network system 10 according to the first embodiment, the misuse detection ECU 100 determines, using the misuse detection unit 130, whether to prevent a data frame that is being received and that has been determined to be unauthorized in accordance with the certain prevention condition indicated by the prevention determination rule stored in the prevention determination rule storage unit 190. The prevention determination rule relating to the certain prevention condition is determined in view of the magnitude of the degree of effect upon vehicle control. The certain prevention condition may be determined, for example, in view of adverse effects upon a vehicle network at a time when an unauthorized frame appears in the bus and the ECUs are prevented from dealing with the unauthorized frame in the same manner as a normal frame and necessity of the prevention, in order to suppress the adverse effects. As a result, it becomes possible to switch whether to prevent, in accordance with the degree of effect upon vehicle control, a data frame determined to be unauthorized as a result of a determination as to compliance with a misuse detection rule (e.g., whether to transmit an error frame and overwrite the unauthorized data frame so that another ECU does not perform a process corresponding to the unauthorized data frame). Adverse effects upon the vehicle network can thus be suppressed, for example, by transmitting an error frame. Consequently, a vehicle including the vehicle network system 10 can maintain safe driving.

Second Embodiment

A vehicle network system 11, which is obtained by partially modifying the vehicle network system 10 described in the first embodiment, will be described hereinafter.

In the vehicle network system 11 according to the present embodiment, a method for dealing with unauthorized frames in which, if a misuse detection ECU detects an unauthorized data frame transmitted to a bus, how to deal with the unauthorized frame is switched in accordance with a state of a vehicle including the vehicle network system 11.

2.1 Overall Configuration of Vehicle Network System 11

Figure 13:
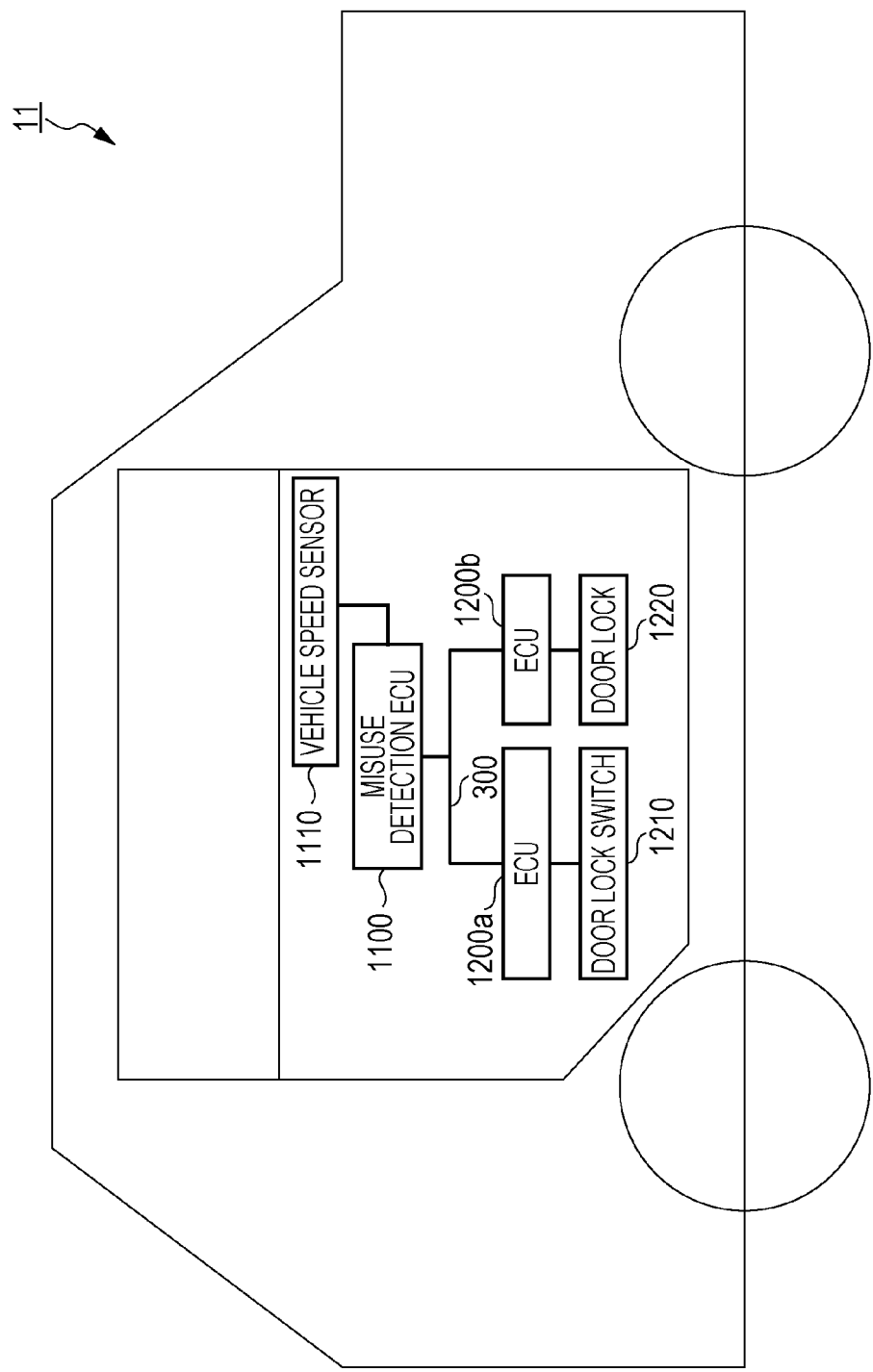
FIG. 13 is a diagram illustrating an overall configuration of a vehicle network system according to a second embodiment.

FIG. 13 is a diagram illustrating an overall configuration of the vehicle network system 11. The vehicle network system 11 is configured by including the bus 300, a misuse detection ECU 1100, and nodes connected to the bus including ECUs, such as ECUs 1200a and 1200b, connected to various devices. The vehicle network system 11 is the same as the vehicle network system 10 in terms of points that are not particularly described herein.

The misuse detection ECU 1100 is a kind of ECU connected to the bus 300 and can monitor frames appearing in the bus connected thereto and detects an unauthorized frame. The misuse detection ECU 1100 is connected to a vehicle speed sensor 1110 and obtains a current state of the vehicle. The misuse detection ECU 1100 has a function of, if an unauthorized frame is detected, dealing with the unauthorized frame, for example, by transmitting an error frame in accordance with a result of a determination whether a certain prevention condition relating to the state of the vehicle is satisfied.

The ECUs 1200a and 1200b are connected to a door lock switch 1210 and a door lock 1220, respectively. The ECU 1200a obtains a state of the door lock switch 1210, includes vehicle control information (information for controlling the door lock 1220 here) relating to the state in a data frame, and transmits the data frame to the bus 300. The ECU 1200b controls opening and closing of the door lock 1220 in accordance with the vehicle control information relating to the state of the door lock switch 1210 included in the data frame transmitted from the ECU 1200a.

2.2 Configuration of Misuse Detection ECU 1100

Figure 14:
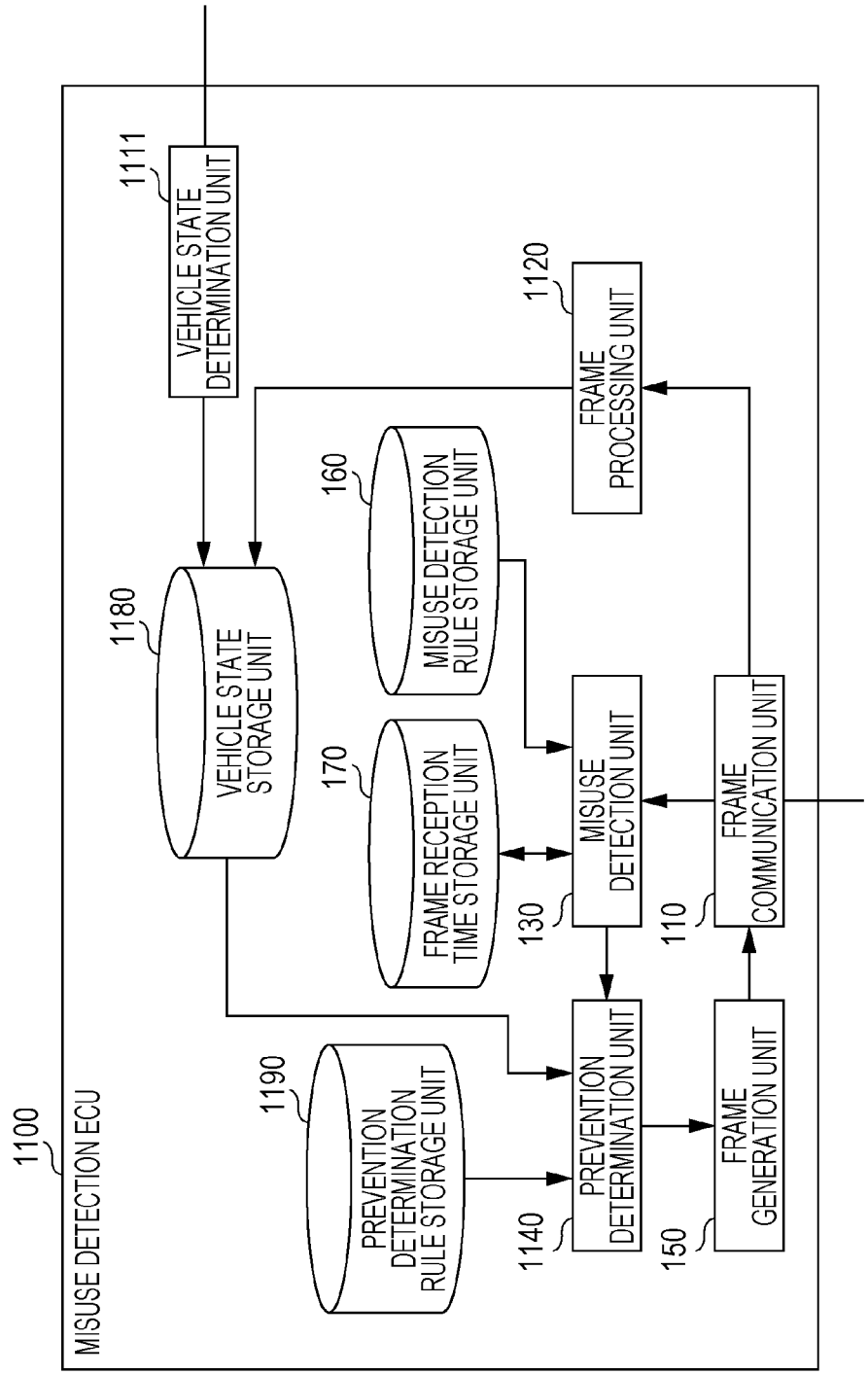
FIG. 14 is a diagram illustrating the configuration of a misuse detection ECU according to the second embodiment.

FIG. 14 is a diagram illustrating the configuration of the misuse detection ECU 1100. The misuse detection ECU 1100 is configured by including the frame communication unit 110, a frame processing unit 1120, the misuse detection unit 130, a prevention determination unit 1140, the frame generation unit 150, the misuse detection rule storage unit 160, the frame reception time storage unit 170, a vehicle state storage unit 1180, a prevention determination rule storage unit 1190, and a vehicle state determination unit 1111. These components are functional components, and functions thereof are achieved by a communication circuit and a processor, a digital circuit, or the like that executes control programs stored in a memory in the misuse detection ECU 1100. It is to be noted that components having the same functions as in the misuse detection ECU 100 described in the first embodiment are given the same reference numerals, and description thereof is omitted.

The frame processing unit 1120 receives information in a data frame from the frame communication unit 110 and interprets the content of the data frame. If the content of the data frame indicates the state of the vehicle, the frame processing unit 1120 may update the state of the vehicle stored in the vehicle state storage unit 1180.

If the prevention determination unit 1140 receives a notification of a data frame determined by the misuse detection unit 130 to be unauthorized, the prevention determination unit 1140 refers to the current state of the vehicle stored in the vehicle control history storage unit 1180. The prevention determination unit 1140 then determines whether to prevent the unauthorized frame by determining whether the certain prevention condition determined in view of a degree of effect upon vehicle control is satisfied. If notified that the misuse detection unit 130 has determined that a data frame including a message ID used by the ECU 200a for transmission is unauthorized, for example, the prevention determination unit 1140 determines whether the certain prevention condition indicated by a prevention determination rule stored in the prevention determination rule storage unit 1190 is satisfied. If vehicle control information included in the data frame determined to be unauthorized and the current state of the vehicle satisfy the certain prevention condition, for example, the prevention determination unit 1140 requests the frame generation unit 150 to generate an error frame in order to prevent the data frame (that is, in order to prevent the ECUs from performing a process corresponding to the data frame). On the other hand, if the certain prevention condition is not satisfied, the prevention determination unit 1140 does not prevent the data frame determined to be unauthorized. An error frame, therefore, is not transmitted.

The vehicle state determination unit 1111 obtains and interprets a value measured by the vehicle speed sensor 1110, determines whether the current state of the vehicle is "running" or "stationary", and stores the state of the vehicle in the vehicle state storage unit 1180 in accordance with a result of the determination.

The vehicle state storage unit 1180 stores the state of the vehicle stored by the vehicle state determination unit 1111 or the frame processing unit 1120 (refer to FIG. 15).

The prevention determination rule storage unit 1190 stores a rule used by the prevention determination unit 1140 to determine whether to prevent a data frame determined to be unauthorized (refer to FIG. 16).

2.3 Example of State of Vehicle

FIG. 15 illustrates an example of the state of the vehicle stored in the vehicle state storage unit 1180.

In the example illustrated in the figure, a running state of the vehicle including the vehicle network system 11 is indicated as the state of the vehicle, and it is indicated that the current state of the vehicle is "running".

2.4 Example of Prevention Determination Rule

FIG. 16 illustrates an example of the rule (certain prevention condition), which is stored in the prevention determination rule storage unit 1190, for determining whether to prevent a data frame. This rule is determined in view of the magnitude of the degree of effect upon vehicle control. In the example illustrated in FIG. 16, the certain prevention condition is determined with which a determination can be made on the basis of vehicle control information included in a data frame determined to be unauthorized and the state of the vehicle stored in the vehicle state storage unit 1180. In this example, if a data frame including vehicle control information relating to the state of the door lock switch 1210 for controlling the door lock 1220 is determined to be unauthorized, the vehicle control information indicates that the door lock is released, and the state of the vehicle is "running", the certain prevention condition is satisfied.

2.5 Configuration of ECU 1200a and ECU 1200b

The configuration of the ECU 1200a is the same as the ECU 200a (refer to FIG. 9). In addition, the ECU 1200b has the same configuration.

The ECU 1200a obtains the state of the door lock switch 1210 using the external device input/output unit 203, generates, in a predetermined period, a data frame for requesting control of the door lock 1220, namely "engaging" or "releasing", using the frame generation unit 204 in accordance with the state of the door lock switch 1210, and transmits the data frame to the frame communication unit 201. The ECU 1200b controls the door lock 1220 in accordance with the data frame transmitted from the ECU 1200a. FIG. 17 illustrates an example of data frames transmitted by the ECU 1200a.

2.6 Example of Data Frames Transmitted by ECU 1200a

FIG. 17 illustrates an example of IDs and data (vehicle control information in data fields) of the data frames transmitted by the ECU 1200a connected to the door lock switch 1210. A value of data of a data frame whose message ID is 0x200 is 0x00 or 0x01 depending on the state of the door lock switch 1210. 0x00 indicates that the door lock 1220 is "engaged", and 0x01 indicates that the door lock 1220 is "released". The data is transmitted using 1 byte. FIG. 17 illustrates, from a top row to a bottom row, an example of message IDs and data corresponding to frames sequentially transmitted by the ECU 1200a. Two data frames for "engaging" the door lock 1220 are transmitted, and then a plurality of data frames for "releasing" the door lock 1220 are transmitted.

2.7 Process for Receiving Data Frame Performed by Misuse Detection ECU 1100

Figure 18:
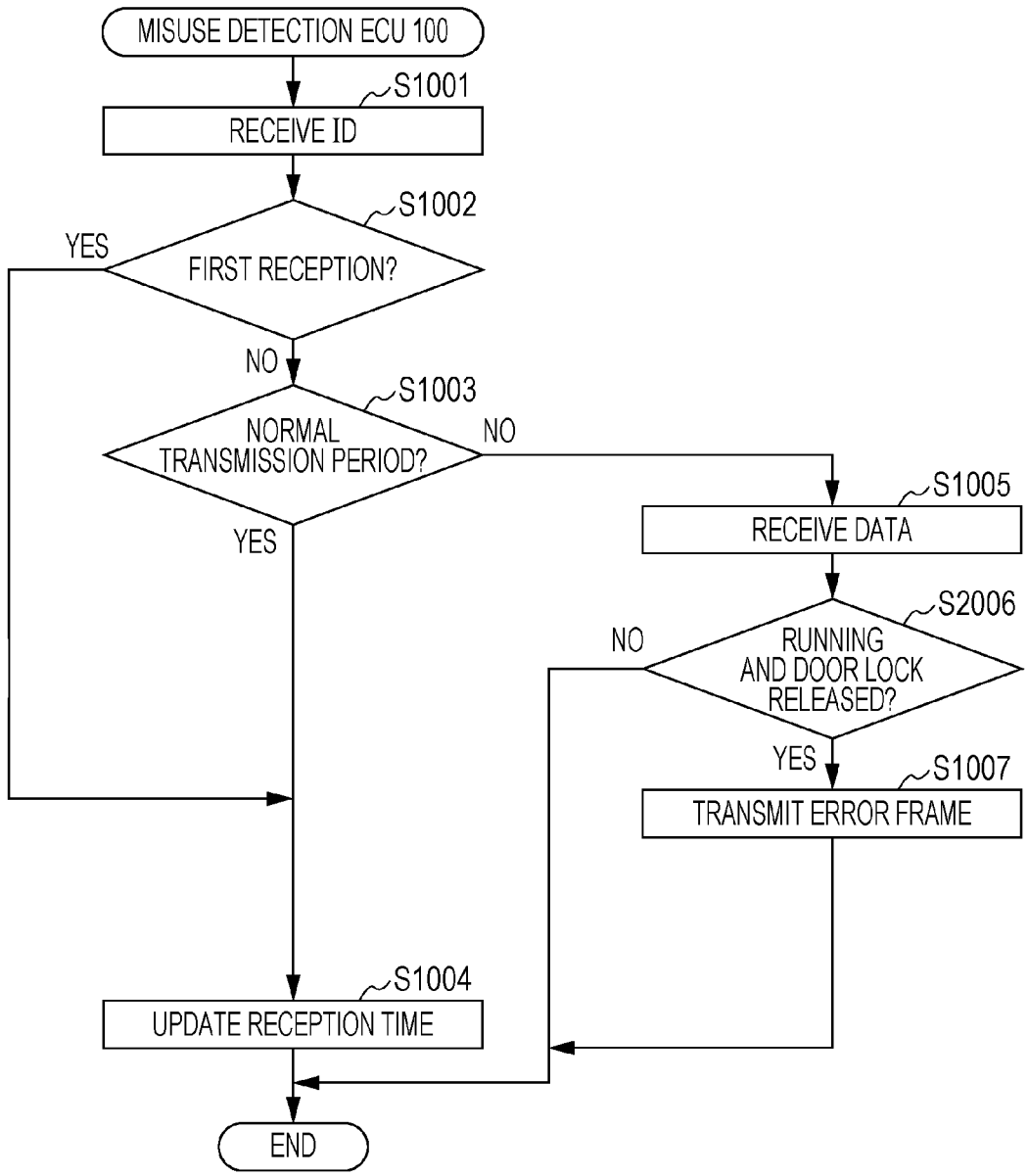
FIG. 18 is a flowchart illustrating a process for receiving a data frame performed by the misuse detection ECU according to the second embodiment.

FIG. 18 is a flowchart illustrating a process for receiving a data frame performed by the misuse detection ECU 1100. The operation of the misuse detection ECU 1100 during reception of a data frame will be described hereinafter with reference to the figure. It is to be noted that the same processing steps as in the process for receiving a data frame performed by the misuse detection ECU 100 described in the first embodiment are given the same reference numerals, and description is omitted as necessary.

The misuse detection ECU 1100 receives an ID (message ID) of a data frame appearing in the bus 300 (step S1001) and determines whether a transmission period identified from a reception time is a normal transmission period (step S1003). If the misuse detection ECU 1100 determines that the transmission period is not a normal transmission period (that is, if the misuse detection ECU 1100 determines that the data frame is an unauthorized frame), the misuse detection ECU 1100 receives a data field (data) of the data frame that is being received (step S1005).

After step S1005, the misuse detection ECU 1100 refers to the data (vehicle control information) in the data frame that is being received and the state of the vehicle stored in the vehicle state storage unit 1180 and determines on the basis of the rule stored in the prevention determination rule storage unit 1190 whether the certain prevention condition is satisfied (step S2006). More specifically, the misuse detection ECU 1100 determines whether the state of the vehicle (running state) is "running" and whether the vehicle control information in the data frame determined to be unauthorized indicates a "released" door lock. If the state of the vehicle is "running" and the vehicle control information indicates a "released" door lock, the misuse detection ECU 1100 determines that the certain prevention condition is satisfied, and transmits an error frame to prevent the unauthorized data frame from reaching the ECU 1200b and the like (step S1007). In other cases (if the certain prevention condition is not satisfied), the misuse detection ECU 1100 skips step S1007 and ends the process for receiving a data frame without transmitting an error frame.

2.8 Advantageous Effects Produced by Second Embodiment

In the vehicle network system 11 according to the second embodiment, the misuse detection ECU 1100 determines, using the misuse detection unit 130, whether to prevent transmission of a data frame that is being received and that has been determined to be unauthorized in accordance with the certain prevention condition indicated by the prevention determination rule stored in the transmission prevention determination rule storage unit 1190. As a result, it becomes possible to switch whether to prevent a data frame that does not comply with a misuse detection rule and that has been determined to be unauthorized in accordance with whether the certain prevention condition determined in view of the degree of effect upon vehicle control according to a relationship with the state of the vehicle is satisfied. It is therefore possible to prevent the transmission of an error frame, for example, from affecting the vehicle network. Consequently, a vehicle including the vehicle network system 11 can maintain safe driving.

Other Embodiments

The first and second embodiments have been described above as examples of the technique according to the present disclosure. The technique according to the present disclosure, however, is not limited to these, and may be applied to embodiments obtained by appropriately conducting modification, replacement, addition, omission, or the like on the above embodiments. The following modifications, for example, are also included in an embodiment of the present disclosure.

(1) Although an example in which a transmission period of a data frame is used in a method for detecting an unauthorized frame on the basis of the misuse detection rules has been described in the above embodiments, another detection method may be used, instead. A detection method in which a misuse is detected if a transmission frequency of data frames is higher than a certain threshold, for example, may be used. In addition, a combination of a plurality of detection methods may be used.

(2) Although a data frame in the CAN protocol is described in a standard ID format in the above embodiments, an extended ID format may be used, instead. In the case of the extended ID format, a total of 29 bits, including a base ID at an ID position in the standard ID format and an extended ID, indicate an ID (message ID) of a data frame. It is to be noted that the vehicle network system need not necessarily perfectly comply with the CAN protocol.

(3) Although a value of a data frame corresponding to one message ID is stored as a vehicle control history in the above embodiments, values of data frames corresponding to a plurality of message IDs may be stored, instead.

(4) Although an example in which a value of a previous data frame is stored as a vehicle control history has been described in the above embodiments, a value of a data frame prior to the previous data frame may be stored, instead. Alternatively, a value a certain frames earlier may be stored as a history. In addition, any type of vehicle control history may be used insofar as the vehicle control history is information regarding a value of a data frame and, for example, part of the content of a data frame may be saved, instead. Alternatively, statistical information such as an average of values of a plurality of data frames may be stored. In addition, although an example of a data frame relating to a window switch has been described as a vehicle control history in the above embodiments, information regarding another data frame may be stored, instead. The vehicle control history described in the above embodiments is an example of history information used for making a determination in accordance with the certain prevention condition, and the history information, for example, can be information in which part of one or more frames transmitted through the bus is recorded. In this case, the misuse detection ECU can determine whether the certain prevention condition is satisfied on the basis of the content of an unauthorized frame and the content of one or more frames transmitted prior to the unauthorized frame by referring to the history information. If the content of a certain field (e.g., data in part of the data field or the like) of the unauthorized frame is different from the content of a certain corresponding field of one of frames including the same frame ID (message ID) as the unauthorized frame transmitted immediately before the unauthorized frame, for example, it may be determined that the certain prevention condition is satisfied. If the content of the certain field matches, it may be determined that the certain prevention condition is not satisfied. This is effective because it is highly necessary to prevent a data frame in order to maintain a safe state of a vehicle when a change in the content of a certain field of the data frame causes control that changes a state of the vehicle.

(5) Although an example in which the misuse detection ECU detects an unauthorized frame, determines whether to prevent the frame, and prevents the frame (transmits an error frame) in accordance with a result of the determination in the above embodiments, the determination whether to prevent the unauthorized frame detected by the misuse detection ECU or the prevention of the unauthorized frame may be performed by another ECU by making the misuse detection ECU issue an instruction through a dedicated communication path or the like, instead. That is, the vehicle network system may be configured such that, if the misuse detection ECU detects an unauthorized frame that does not comply with the certain rule and the certain prevention condition is satisfied, a certain apparatus may perform a process for preventing the ECUs from performing a process corresponding to the unauthorized frame and, if the certain prevention condition is not satisfied, the prevention process is not performed.

(6) If detecting an unauthorized frame, the misuse detection ECU described in the above embodiments may record information such as the content of the unauthorized frame and a detection time in a storage medium or the like as log information, regardless of whether to prevent the frame. In the above-described method for dealing with unauthorized frames, the misuse detection rules can be flexibly established in view of the possibility of erroneous detection, not uniformly preventing frames that do not comply with the misuse detection rules. In addition, the log information may be employed in the future, for example, in order to update the misuse detection rules.

(7) Although an example in which transmission of a frame is prevented if there has been a change in a value of vehicle control information, which is a content of the data frame, has been described in the above embodiments, another rule may be provided, instead. A rule with which transmission of a frame is prevented if a value of a data field of the data frame has decreased or increased, for example, may be provided. Alternatively, the prevention determination rule may be a rule with which transmission of a frame is prevented if there has been a change larger than a threshold. Alternatively, as the prevention determination rule, a condition in which a plurality of vehicle control histories are used may be used. Alternatively, the prevention determination rule may be a rule, for example, used for determining whether to prevent transmission of a data frame on the basis of calculation of the content of a data field of a data frame determined to be unauthorized and the content of data fields of one or more data frames.

(8) Although an example in which the state of the vehicle indicates "running" or "stationary" has been described in the above embodiments, other running states, namely, for example, "reversing" and "high-speed running", may also be indicated.

(9) Although an example in which the state of the vehicle indicates the running state has been described in the above embodiments, a state other than the running state (e.g., a state relating to the amount of fuel remaining, an on/off state of a light, or the like) may be indicated, instead. In addition, the state of the vehicle may include an operation state such as a rotational angle of a steering wheel, a past misuse detection history, statistical information regarding the amount of traffic in various buses in the vehicle network, or the like that can be indicated by the content of data frames communicated through the buses. In addition, the state of the vehicle may further include information such as a model of a vehicle including the misuse detection ECU, a manufacturing maker, and a distance covered.

(10) Although an example in which a condition relating to the state of the vehicle is provided as the certain prevention condition has been described in the above embodiments, a condition relating to at least any of the state of the vehicle, a state of a driver of the vehicle including the vehicle network system, and a state of a driving environment of the vehicle may be provided, instead. In addition, the misuse detection ECU may determine whether the certain prevention condition is satisfied on the basis of the content of an unauthorized frame, the content of one or more frames transmitted prior to the unauthorized frame, and a result of detection of at least any of the state of the vehicle, the state of the driver of the vehicle, and the state of the driving environment of the vehicle. Measured values or information relating to the state of the driver of the vehicle and the state of the driving environment of the vehicle can be obtained by receiving operations performed through a user interface, through sensors, or through communication between the vehicle network system and an external apparatus. Communication may be performed with the external apparatus (e.g., a computer or the like) by any communication method. The state of the driving environment of the vehicle, for example, can be indicated by map information indicating a position at which the vehicle is currently running, an area encompassing the running position, information such as a country, weather information regarding the running position, information regarding a state of a road surface, information indicating traffic conditions, and the like. In addition, the state of the driver of the vehicle, for example, can be indicated by a period for which the driver has been driving, biological information regarding the driver such as a pulse rate, or the like.

(11) Although data frames relating to control of a power window and a door lock have been described in the above embodiments as examples of a target whose operation performed by the ECUs due to an unauthorized frame is prevented, the target is not limited to these. Any of data frames relating to various types of control in the vehicle, such as control of wipers and driving control of the vehicle including "running", "turning", and "stopping", can be the target.

(12) Although a frame reception time is not updated for a data frame determined by the misuse detection unit to be unauthorized in the above embodiments, the prevention determination unit may update a frame reception time for a data frame determined by the prevention determination unit not to be prevented.

(13) Although the misuse detection ECU is activated when the ignition state is entered in the above embodiments, this is just an example. The misuse detection ECU may be activated at another time, instead, that is, for example, when a battery begins to supply power to each ECU in the vehicle network system.

(14) Although the reception time is set to 0 when the misuse detection ECU is activated in the above embodiments, this is just an example. The reception time may be set to 0 at another time, instead. Alternatively, the reception time may be reset to 0 when the reception time has not been updated for a certain period of time.

(15) Although the reception time is set to 0 when the misuse detection ECU is activated in the above embodiments, the reception time, for example, may be stored in a nonvolatile memory and need not be set to 0 when the misuse detection ECU is activated, instead.

(16) Although an example in which the reception time is stored in order to obtain a transmission period of a data frame has been described in the above embodiments, the reception time need not necessarily be stored insofar as reception intervals of data frames can be calculated. Because it is sufficient that a relative time difference between reception times of two data frames be obtained, for example, a timer may be set upon the reception of the first data frame and a reception interval (transmission period) may be obtained on the basis of a value of the timer at the time of the reception of the second data frame.

(17) Although an error frame is transmitted as a process (means) for preventing the ECUs from performing a process (control) corresponding to an unauthorized frame in order to prevent transmission of the unauthorized frame in the above embodiments, the prevention process is not limited to this. As the prevention method, for example, a bit value flowing through the bus may be changed while an unauthorized data frame is being transmitted, and an error may be detected by checking a CRC of the data frame using a receiving ECU, instead. In addition, while an unauthorized frame is being transmitted, the misuse detection ECU may notify the other ECUs of an abnormality through a dedicated communication path other than the bus and that an unauthorized frame must not be processed in the same manner as an authorized frame. Alternatively, a misuse detection ECU having a function of a gateway that performs control relating to transfer of a frame between buses when the vehicle network system includes a plurality of buses (that is, a function of transferring a frame appearing in one of the plurality of buses to another) may perform a process for suppressing transfer of an unauthorized frame detected in a bus to another. It is to be noted that when the misuse detection ECU performs the process for preventing an unauthorized frame, a certain effect can be caused in the vehicle network system. It is therefore effective to perform the prevention only if the certain prevention condition determined in consideration of an effect upon vehicle control is satisfied.

(18) Although the misuse detection ECU and the other ECUs according to the above embodiments are each an apparatus including a digital circuit, an analog circuit, a communication circuit, and the like such as a processor and a memory, for example, the misuse detection ECU and the other ECUs may each also include another piece of hardware such as a hard disk device, a display, a keyboard, a mouse, or the like. In addition, instead of achieving a function in a software manner by executing a control program stored in the memory using the processor, the function may be achieved by dedicated hardware (digital circuit or the like).

(19) Part or all of the components included in each apparatus in the above embodiments may be configured by a single system large scale integration (LSI). A system LSI is an ultra-multifunctional LSI fabricated by integrating a plurality of components on a chip and, more specifically, a computer system configured by including a microprocessor, a ROM, a RAM, and the like. A computer program is recorded on the RAM. When the microprocessor operates in accordance with the computer program, the system LSI achieves a function. In addition, each part of the components included in each apparatus described above may be individually achieved as a chip, or part or all of the components may be achieved as a chip. Although the term "system LSI" is used here, a term "integrated circuit (IC)", "LSI", "super LSI", or "ultra LSI" may be used depending on a difference in a degree of integration. A method for fabricating an integrated circuit is not limited to the LSI, but an integrated circuit may be achieved by a dedicated circuit or a general-purpose processor, instead. After an LSI is fabricated, a field-programmable gate array (FPGA) or a reconfigurable processor that allows connections and settings of circuit cells inside the LSI to be reconfigured may be used. Furthermore, if an integrated circuit technique that replaces the LSI appears as a result of evolution of semiconductor technologies or other derivative technologies, function blocks may be naturally integrated with one another using the technique. Applications such as biological technologies are possible.

(20) Part or all of the components included in each apparatus described above may be configured by an IC card or an individual module removably attached to each apparatus, instead. The IC card or the module is a computer system configured by a microprocessor, a ROM, a RAM, and the like. The IC card or the module may include the ultra-multifunctional LSI. The IC card or the module achieves a function thereof when the microprocessor operates in accordance with a computer program. The IC card or the module may be tamper-resistant.

(21) An aspect of the present disclosure, for example, may be the method for dealing with unauthorized frames illustrated in FIG. 12, 18, or the like. Alternatively, an aspect of the present disclosure may be a computer program that achieves these methods using a computer, or may be a digital signal consisting of the computer program. In addition, an aspect of the present disclosure may be a computer-readable recording medium, such as a flexible disk, a hard disk, a CD-ROM, a magneto-optical (MO) disk, a digital versatile disc (DVD), a DVD-ROM, a DVD-RAM, a Blu-ray Disc (BD; registered trademark), or a semiconductor memory, storing the computer program or the digital signal. In addition, an aspect of the present disclosure may be the digital signal recorded on one of these recording medium. In addition, an aspect of the present disclosure may be the computer program or the digital signal transmitted through an electrical communication line, a wireless or wired communication line, a network typified by the Internet, data-casting, or the like. In addition, an aspect of the present disclosure is a computer system including a microprocessor and a memory, and the computer program is recorded on the memory. The microprocessor may operate in accordance with the computer program. In addition, another independent computer system may implement an aspect of the present disclosure by recording the program or the digital signal on the recording medium and transporting the recording medium or by transporting the program or the digital signal through the network or the like.

(22) Embodiments achieved by arbitrarily combining the components and the functions described in the above embodiments and modifications are also included in the scope of the present disclosure.

An aspect of the present disclosure can be used for dealing with an unauthorized frame in view of an effect upon vehicle control and the like when transmission of the unauthorized frame to a bus is detected in a vehicle network.

What is claimed is:

1. A method for dealing with unauthorized frames used by a unauthorized frame detection electronic control unit (ECU) that is connected to a bus used by a plurality of electronic control units (ECUs) in a vehicle network system to communicate frames and that checks a frame appearing in the bus, the method comprising:
  receiving the frame from the bus;
  recording at least part of a content of the frame in a memory as history information;
  determining whether the frame is an unauthorized frame on the basis of a certain rule;
  in a case that the frame is determined to be an authorized frame, updating frame reception history information;
  in a case that the frame is determined to be an unauthorized frame,
  determining whether a certain prevention condition is satisfied on the basis of content of the unauthorized frame, (ii) content of the one or more of the frames transmitted prior to the unauthorized frame by referring to the history information, and (iii) a result of at least one of a state of a vehicle having the unauthorized frame detection electronic control unit, a state of the driver of the vehicle, and a state of the driving environment of the vehicle;
  preventing at least one of the plurality of electronic control units from performing a process corresponding to the unauthorized frame in case that the certain prevention condition is satisfied; and
  not preventing the at least one of the plurality of electronic control units from performing the process corresponding to the unauthorized frame in case that the certain prevention condition is not satisfied.

2. The method according to claim 1,
wherein in the preventing, changing a bit value relating to the unauthorized frame appearing in the bus.

3. The method according to claim 2,
wherein the plurality of electronic control units perform communication through the bus in accordance with a controller area network (CAN) protocol,
wherein in the determining, it is determined that the certain prevention condition is satisfied in case that content of a certain field of the unauthorized frame is different from content of the certain field of one of the frames (i) including the same frame ID as the unauthorized frame and (ii) transmitted immediately before the unauthorized frame, and
wherein in the determining, it is determined that the certain prevention condition is not satisfied in case that the content of the certain field of the unauthorized frame matches the content of the certain field of one of the frames.

4. The method according to claim 2,
wherein the state of a vehicle includes at least one of a speed of the vehicle, a rotational angle of a steering wheel, statistical information regarding amount of traffic in the bus, and history information regarding detection of unauthorized frames that do not comply with the certain rule.

5. The method according to claim 2,
wherein the certain prevention condition is a condition relating to at least one of a state of a vehicle having the unauthorized frame detection electronic control unit, a state of a driver of the vehicle, and a state of a driving environment of the vehicle, and
wherein in the determining, it is determined whether the certain prevention condition is satisfied on the basis of a result of detection of at least one of the state of the vehicle, the state of the driver of the vehicle, and the state of the driving environment of the vehicle.

6. The method according to claim 1,
wherein, in the vehicle network system, a plurality of buses are used for the communication performed by the plurality of electronic control units and the unauthorized frame detection electronic control unit transferring a frame appearing one of the plurality of buses to another bus,
wherein preventing from transferring the unauthorized frame in case that the unauthorized frame appearing in the one of the plurality of buses is detected and the certain prevention condition is satisfied, and
wherein transferring the frame in case that the certain prevention condition is not satisfied.

7. The method according to claim 1,
wherein the plurality of electronic control units perform communication through the bus in accordance with a controller area network protocol.

8. The method according to claim 7,
wherein in the preventing, transmitting an error frame to the bus.

9. An unauthorized frame detection electronic control unit (ECU) that is connected to a bus used by a plurality of electronic control units (ECUs) to communicate frames and that checks a frame appearing in the bus, the unauthorized frame detection electronic control unit comprising:
a processor; and
a memory having a computer program stored thereon, the computer program causing the processor to execute operations including
receiving the frame from the bus;
recording at least part of a content of the frame in a memory as history information;
determining whether the frame is an unauthorized frame on the basis of a certain rule;
in a case that the frame is determined to be an authorized frame, updating frame reception history information;
in a case that the frame is determined to be an unauthorized frame,
determining whether a certain prevention condition is satisfied on the basis of content of the unauthorized frame, (ii) content of the one or more of the frames transmitted prior to the unauthorized frame by referring to the history information, and (iii) a result of at least one of a state of a vehicle having the unauthorized frame detection electronic control unit, a state of the driver of the vehicle, and a state of the driving environment of the vehicle;
preventing at least one of the plurality of electronic control units from performing a process corresponding to the unauthorized frame in case that the certain prevention condition is satisfied; and
not preventing the at least one of the plurality of electronic control units from performing the process corresponding to the unauthorized frame in case that the certain prevention condition is not satisfied.

10. A vehicle network system, comprising:
a plurality of electronic control units (ECUs) that communicate frames through a bus; and
an unauthorized frame detection electronic control unit (ECU) that is connected to the bus and that checks a frame appearing in the bus,
wherein the unauthorized frame detection electronic control unit includes,
a processor, and
a memory having a computer program stored thereon, the computer program causing the processor to execute operations including
receiving the frame from the bus;
recording at least part of a content of the frame in a memory as history information;
determining whether the frame is an unauthorized frame on the basis of a certain rule;
in a case that the frame is determined to be an authorized frame, updating frame reception history information;
in a case that the frame is determined to be an unauthorized frame, determining whether a certain prevention condition is satisfied on the basis of (i) content of the unauthorized frame, (ii) content of the one or more of the frames transmitted prior to the unauthorized frame by referring to the history information, and (iii) a result of at least one of a state of a vehicle having the unauthorized frame detection electronic control unit, a state of the driver of the vehicle, and a state of the driving environment of the vehicle;
preventing at least one of the plurality of electronic control units from performing a process corresponding to the unauthorized frame in case that the certain prevention condition is satisfied; and
not preventing the at least one of the plurality of electronic control units from performing the process corresponding to the unauthorized frame in case that the certain prevention condition is not satisfied.

11. The method according to claim 1,
wherein in the determining of the certain condition,
(A) in case that content of a certain field of the unauthorized frame is different from content of the certain field of one of the frames (i) which includes the same frame ID as the unauthorized frame, and (ii) which is transmitted immediately before the unauthorized frame, and
(I) in a case that a result of at least one of a state of a vehicle having the unauthorized frame detection electronic control unit, a state of the driver of the vehicle, and a state of the driving environment of the vehicle is satisfied a predetermined condition, it is determined that the certain prevention condition is satisfied,
(II) in a case that a result of at least one of a state of a vehicle having the unauthorized frame detection electronic control unit, a state of the driver of the vehicle, and a state of the driving environment of the vehicle is not satisfied a predetermined condition, it is determined that the certain prevention condition is not satisfied, and
(B) in case that the content of the certain field of the unauthorized frame matches the content of the certain field of one of the frames, it is determined that the certain prevention condition is not satisfied.

* * * * *